Nov. 11, 1969   G. A. DOTTO   3,477,460
FLUID LEVEL CONTROL SYSTEM
Filed Aug. 2, 1965
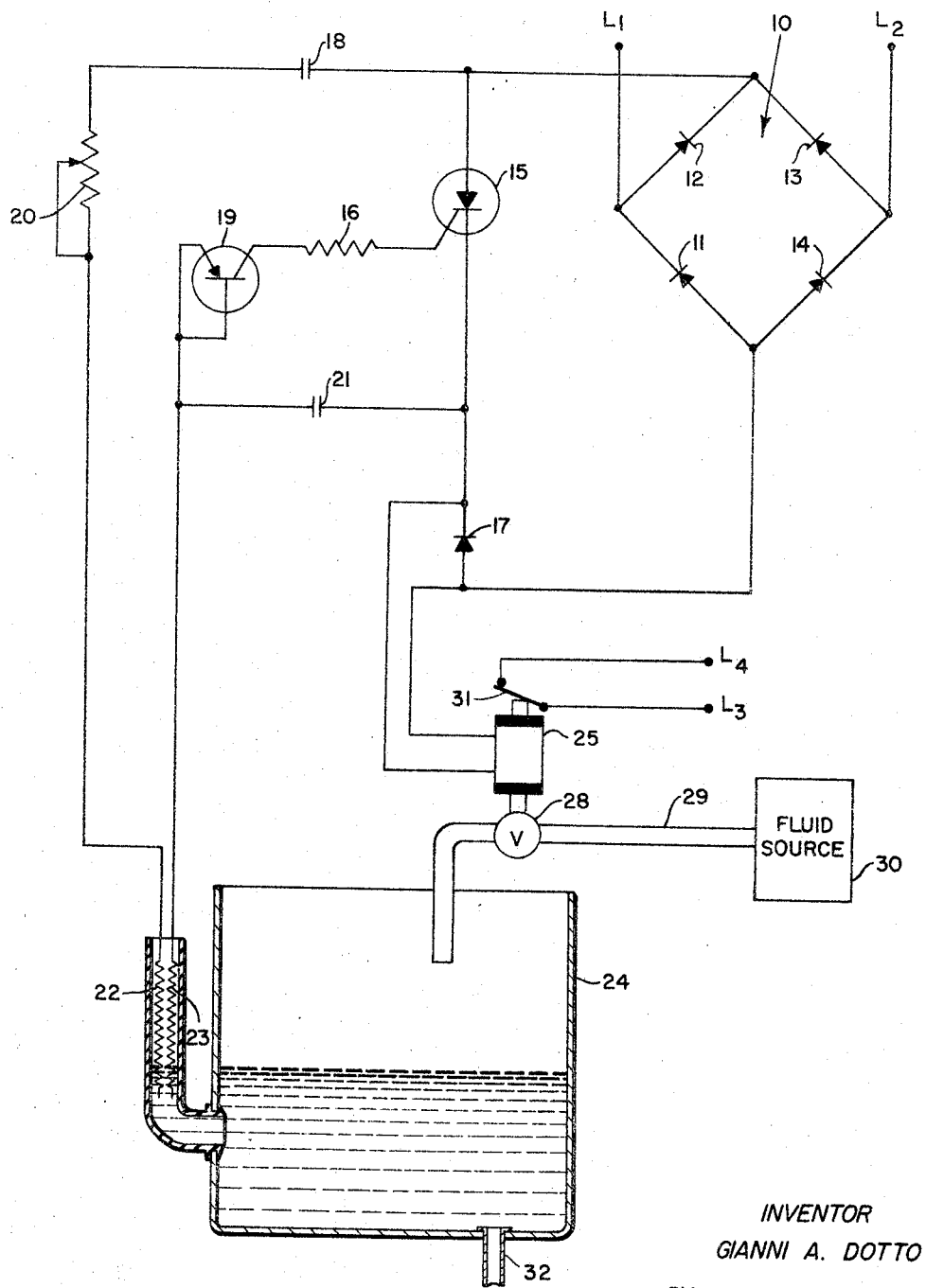
INVENTOR
GIANNI A. DOTTO
BY
ATTORNEY United States Patent Office 3,477,460
Patented Nov. 11, 1969

3,477,460
FLUID LEVEL CONTROL SYSTEM
Gianni A. Dotto, Dayton, Ohio, assignor to P. R. Mallory & Co. Inc., Indianapolis, Ind., a corporation of Delaware
Filed Aug. 2, 1965, Ser. No. 476,451
Int. Cl. G05d 9/12
U.S. Cl. 137—392          3 Claims

ABSTRACT OF THE DISCLOSURE

A solid-state circuit in conjunction with a variable resistor and a pair of resistors placed in a fluid controls the fluid level through actuation of a solenoid which controls the fluid flow.

---

The present invention relates generally to fluid level control systems and more particularly to the means and method for providing a solid state circuit for controlling the level of fluid in a container.

Many equipment applications and processes in use today require an accurate control of the level of fluid in a container. In general, there have been three approaches to this problem. One approved has been to use a float which mechanically closes a valve or operates a switch when the fluid is at a predetermined level. Another approach has been to use a pressure switch which is actuated by a predetermined level of fluid. A third approach has been to fill the container for a given period of time from a constant pressure fluid source. All of these three approaches have one or more serious drawbacks. For instance, the "float approach" is rather bulky and is easily rendered inaccurate or inoperative by impurities in the fluid which interfere with the mechanism. Likewise, the pressure switch is usually not considered accurate because the operation depends on the depression of a diaphragm at given fluid levels. This depression, which is also dependent on atmospheric conditions and the temperature of the fluid in the container, causes a switch to actuate a solenoid-operated valve in the fluid supply line. The constant pressure time approach is limited by the fact that after the container is filled the first time, it must be completely emptied before it can be accurately filled again.

Accordingly, the present invention provides a solid state circuit for accurately controlling the level of a fluid in a container. The output of the circuit is dependent on the value of resistive elements which are connected by the fluid as it rises in the container. The accuracy is therefore, dependent on the characteristics of the resistive elements. A very accurate system can be devised, within the scope of the present invention, wherein there is a large change in resistance of the sensing elements for very small changes in fluid level.

It will be noticed that every attempt has been made to make the circuitry of the present invention as simple as possible. There are a minimum of components and the only moving parts are a solenoid and a valve, said valve being operated by said solenoid when the circuit provides an output. Other embodiments of the present invention will become obvious as the specification progresses. For instance, the circuitry and sensing elements described in this specification can be used to control a hydraulic pump which provides fluid for a container. The hydraulic pump, which could replace the solenoid and valve, would be energized by the firing of a silicon controlled rectifier in series with the hydraulic pump motor.

A typical application for the present invention would be controlling of water level in an automatic washing machine. Other applications will become obvious as the specification progresses.

It is an object, therefore, of the present invention to provide a means for controlling the level of a fluid in a container.

Another object of the present invention is to provide a solid state circuit for controlling the level of a fluid in a container.

Another object of the present invention is to provide a system for controlling the level of a fluid in a container wherein a resistive means for determining a level of fluid is utilized.

Yet another object of the present invention is to provide a solid state control circuit that will actuate a solenoid-operated valve to control the flow of fluid into a container.

Still anther object of the present invention is to provide a solid state control circuit that will actuate a hydraulic pump to control the flow of fluid into a container.

Still another object of the present invention is to provide an accurate fluid level control system which is not dependent on atmospheric conditions or the temperature of the fluid.

Still another object of the present invention is to provide a fluid level control system which is reliable, efficient, and economical to manufacture.

The present invention, in another of its aspects, relates to novel features of the instrumentalities described herein for teaching the principal object of the invention and to the novel principles employed in the instrumentalities whether or not these features and principles may be used in the said object and/or in the same field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

FIGURE 1 is a schematic diagram showing one embodiment of the present invention.

Generally speaking, the present invention is a means for controlling the level of fluid comprising, a reservoir, a sensor for determining a level of fluid therein, a control circuit coupled to said sensor so as to maintain said level of fluid, said control circuit having a means for actuating a valve, and said valve being a means for preventing flow of fluid into said reservoir when a predetermined level of fluid is achieved.

Referring now to the drawing, FIGURE 1, the component parts of the fluid level control system can be visualized in conjunction with the following description. Terminal L1 is connected to a first side of an alternating current power source and terminal L2 is connected to a second side of said alternating current power source. A bridge network 10, containing diodes 11, 12, 13 and 14 arranged so as to provide rectification of an alternating current power source, is connected across L1 and L2. A multijunction-unidirectional semiconductive device, hereinafter referred to as a silicon controlled rectifier 15, and a diode 17 are connected in series across the output side of bridge network 10, the cathode of said silicon controlled rectifier being connected to the cathode of said diode. A first end of a resistor 16 is connected to the gate electrode of the silicon controlled rectifier 15 and a second end of said resistor is connected to the collector of transistor 19. The emitter and base of transistor 19 are coupled together and connected to a first side of capacitor 21. The second side of capacitor 21 is connected to a midpoint between the cathode of the silicon controlled rectifier 15 and the cathode of diode 17. A first side of capacitor 18 is connected to the anode of the silicon controlled rectifier 15 and a second side of said capacitor is connected to a first side of a variable resistor means, hereinafter referred to as adjustable resistor 20. The second side of adjustable resistor 20 is connected to one side of a first level sensing resistor 22, the other side of said level sensing resistor extends into a reservoir, hereinafter referred to as to container 24, without being electrically connected to any other component. A second level sensing resistor 23 extends into the container so as to have one side free of any electrical connection, the other side of said level sensing resistor being connected to a common point connecting the emitter and base of transistor 19 to a first side of capacitor 21. A solenoid 25 is coupled across diode 17 so as to be in series with the silicon controlled rectifier 15. The plunger 26 of the solenoid 25 is spring loaded so as to remain in a de-activated position unless the solenoid is energized. The spring providing said spring load is not shown in the drawing. The plunger 26 actuates a valve 28 in the supply line 29 connecting the container 24 with a fluid source 30. Hence, the solenoid 25 and valve 28 represents a typical solenoid-operated valve. Solenoid 25 also operates to open normally closed switch 31 which is across an alternating current power source represented by L3 and L4. There is an outlet 32 in container 24 for removal of the fluid.

The adjustable resistor 20 is a means for varying the control circuit of the present invention so as to maintain various fluid levels or a means for varying the control circuit so as to provide an output at various states of the level sensing means. The transistor 19 is a means for storing energy and firing the silicon controlled rectifier 15. It is recognized that a Zener diode or a neon light could perform the same function. It is for this reason that transistor 19 will be referred to as a means for firing a silicon controlled rectifier.

The solenoid operated valve 28 is a means for preventing fluid flow into container 24.

With the above description of components in mind, and by making reference to the drawing figures, the following analysis of operation will serve to convey the functional details of the present invention. The alternating current applied across L1 and L2 is transformed into pulsating direct current by the bridge network 10. The pulsating direct current is applied across the silicon controlled rectifier 15, capacitor 18, adjustable resistor 20, and the capacitor 21.

When the adjustable resistor 20 is set at a value which, when added to the value of the resistance of the fluid between level sensing resistors 22 and 23, will allow current to flow to charge capacitor 18 and 21 and when said level sensing resistors are shorted out by the fluid so as to present no resistance other than the resistance of said fluid between said level sensing resistors, current can flow through said adjustable resistor to charge said capacitors with sufficient voltage to turn on transistor 19. When transistor 19 is turned on, sufficient current can flow through resistor 16 to the gate electrode of silicon controlled rectifier 15 to fire said silicon controlled rectifier. When the silicon controlled rectifier 15 is fired, or becomes conductive, current can flow through solenoid 25 to energize said solenoid and operate valve 28 in supply line 29 connecting the fluid source 30 to the container 24. The operation of valve 28 prevents the flow of fluid into container 24 and, thereby controls the level of the fluid in the container. The controlling factor is the sum of the resistances of the adjustable resistor 20, level sensing resistors 22 and 23, and the resistance of the fluid between said level sensing resistors. If the sum is sufficiently high current cannot flow to turn on transistor 19 to fire the silicon controlled rectifier 15 and actuate solenoid 25 to close valve 28. Hence, fluid will continue to flow into container 24.

The fluid level can be selectively adjusted by adjustable resistor 20 so that the sum of the resistances of said adjustable resistor, level sensing resistors 22 and 23 and the resistance of the fluid between said level sensing resistors will be sufficiently low to allow current to flow when said level sensing resistors are only partially covered by fluid. For instance, assume that a resistance less than 250,000 ohms will permit sufficient current to flow so as to fire the silicon controlled rectifier 15. If adjustable resistor 20 is completely shorted out so as to present no resistance, the fluid level in the container 24 will rise until the sum of the resistances of level sensing resistors 22 and 23 and the resistance of the fluid between said level sensing resistor is less than 250,000 ohms.

It can be seen that the two level sensing resistors 22 and 23 could be replaced by a single level sensing resistor and a metallic strip physically positioned parallel to said single level sensing resistor. Further, if the container 24 was of the proper metallic structure, one level sensing resistor could be used and the container could suffice as the metal strip. The reason for using two level sensing resistors 22 and 23 is that a high resistance is required and that the total resistance can be divided between the two resistors, thereby providing a more accurate level sensing means.

Because several different variations of level sensing resistors can be devised, the level sensing resistors of the present invention will be referred to as a resistive means for sensing a predetermined level of fluid or as a sensor for determining a level of fluid in a container, or as a fluid level sensing means.

The diode 17, in parallel with the solenoid 25, serves to clamp the inductive voltage generated by the solenoid so as to protect the cathode of the silicon controlled rectifier 15.

It is assumed in the operation analysis, hereinbefore presented, that the fluid source 30 has sufficient pressure to cause fluid to flow through supply line 29 unless the valve 28 is closed. If this was not the case, a hydraulic pump could be operated to fill the container 24 as required.

What is claimed is:

1. A means for controlling the level of a fluid in a container comprising, a fluid source coupled to said container, a valve coupled between said fluid source and said container so as to prevent flow of said fluid when said valve is actuated, a solid state circuit coupled to a resistive means for sensing a predetermined level of said fluid, said solid state circuit having a silicon controlled rectifier connected in series with a solenoid and being coupled between a variable resistor and a pair of closely spaced resistance elements disposed within said fluid through a pair of capacitors and means to fire said silicon controlled rectifier when said closely spaced resistance elements are in a predetermined state, and said silicon controlled rectifier functioning to energize said solenoid so as to actuate said valve when said predetermined level of said fluid is obtained.

2. A means for controlling the level of a fluid in a container comprising, a fluid source coupled to said container a valve coupled between said fluid source and said container so as to prevent flow of said fluid when said valve is actuated, a solid state circuit coupled to a resistive means for sensing a predetermined level of said fluid, said solid state circuit containing a bridge circuit for providing a proper direct current voltage to a silicon controlled rectifier connected in series with a solenoid, said silicon controlled rectifier being coupled between a variable resistor and a pair of closely spaced resistance elements disposed within said fluid through a pair of capacitors and means to fire said silicon controlled rectifier when said closely spaced resistance elements are in a predetermined state, and said silicon controlled rectifier functioning to energize said solenoid so as to actuate said valve when said predetermined level of said fluid is obtained.

3. A means for controlling the level of a fluid in a container comprising, a diode bridge circuit coupled across an alternating current power source, a silicon controlled rectifier and a solenoid coupled in series across said bridge circuit, a transistor coupled to a gate of said silicon controlled rectifier through a resistor so as to fire said silicon controlled rectifier when said transistor is turned on, said transistor having an emitter and base tied together to one side of a first capacitor, said first capacitor having its other side coupled to a cathode electrode of said silicon controlled rectifier, a second capacitor coupled between an anode of said silicon controlled rectifier and one side of an adjustable resistor, said first and second capacitors functioning to turn on said transistor when charged with a proper voltage, said proper voltage being dependent on a predetermined resistance of a pair of closely spaced resistance elements disposed within said fluid and being electrically connected in series to said adjustable resistor for sensing the level of said fluid in said container and said adjustable resistor, said adjustable resistor being a means for determining a fluid level which will represent said predetermined resistance, said solenoid being coupled to a valve in a supply line connecting a fluid source to said container, said solenoid and said valve being a means for preventing flow of said fluid when a predetermined fluid level is established in said container.

References Cited

UNITED STATES PATENTS 2,581,085   1/1952   Edelman.

WILLIAM F. O'DEA, Primary Examiner

D. R. MATTHEWS, Assistant Examiner

U.S. Cl. X.R.

73—304; 317—123, 153; 324—30; 340—244